(No Model.)
P. KILROY & J. A. FLICK.
Boiler Furnace.
No. 235,779. Patented Dec. 21, 1880.
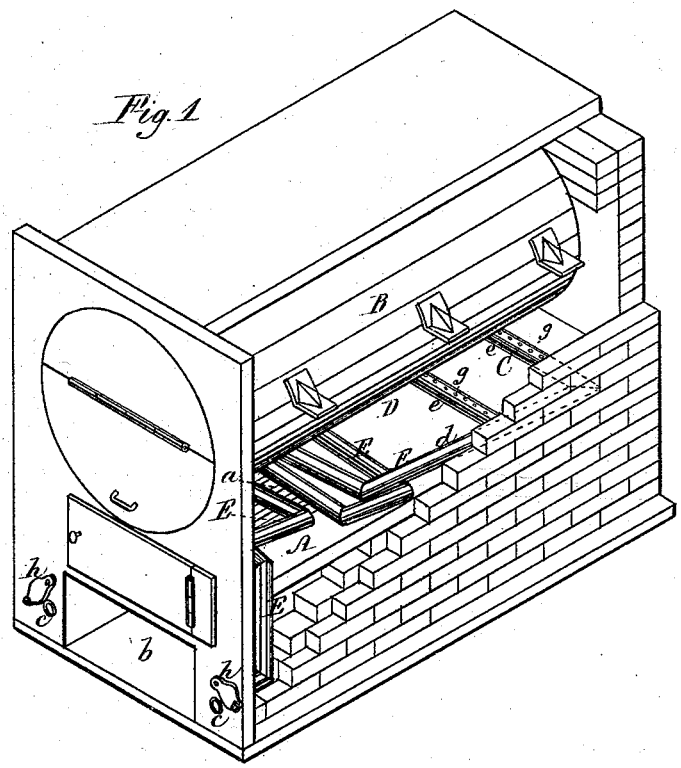
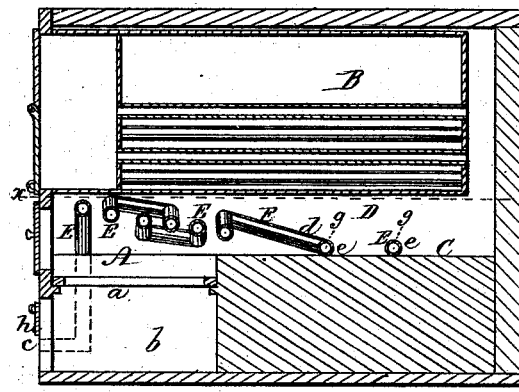
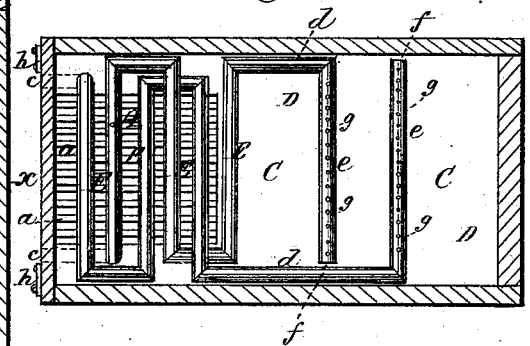
Witnesses:
W. A. Cambridge
Chas. E. Griffin
Inventors
Peter Kilroy
Julius A. Flick
per R. E. Tuchemacher
Atty

UNITED STATES PATENT OFFICE.

PETER KILROY AND JULIUS A. FLICK, OF BOSTON, MASSACHUSETTS.

BOILER-FURNACE.

SPECIFICATION forming part of Letters Patent No. 235,779, dated December 21, 1880.

Application filed September 22, 1880. (No model.)

*To all whom it may concern:*

Be it known that we, PETER KILROY and JULIUS A. FLICK, citizens of the United States, residing at Boston, in the county of Suffolk and State of Massachusetts, have invented an Improvement in Smoke and Gas Consuming Furnaces, of which the following is a full, clear, and exact description, reference being had to the accompanying drawings, making part of this specification, in which—

Figure 1 is a perspective view of a steam-boiler and its furnace having our improvement applied thereto, a portion of one of the side walls of the furnace being broken away to show the interior thereof. Fig. 2 is a longitudinal vertical section through the same. Fig. 3 is a horizontal section on the line $x$ $x$ of Fig. 2.

Our invention has for its object to promote the combustion of smoke and gases in a furnace, thereby intensifying the heat and economizing fuel; and our invention consists in a novel arrangement of pipes or air-superheaters, which are placed crosswise within the furnace and directly over and above the fire, these pipes also extending back in the rear of the fire and transversely across the flame-bed and combustion-chamber, where they are provided with a series of perforations, through which the air, after being superheated in that portion of the pipes immediately over the fire, is emitted in fine jets or streams, which impinge upon and become thoroughly commingled with the smoke and gaseous products of combustion as they pass over the flame-bed, whereby their perfect ignition and consumption is insured, this construction being exceedingly simple and inexpensive, and enabling us to apply our invention to a furnace so as to secure all of the advantages resulting from the discharge of superheated air into the combustion-chamber at a very much less expense than has hitherto been possible, for the reason that no alteration of or tearing down the brick-work or setting of the furnace, as heretofore, is required.

In the said drawings, A represents the furnace; B, the boiler; $a$, the grate-bars; $b$, the ash-pit; C, the flame-bed, and D the combustion-chamber.

Within the furnace A are angularly arranged a pair of superheating-pipes, E E, bent into the form shown, so as to pass and repass each other—these pipes, which may be composed of iron or other suitable material best adapted to resist the action of heat, extending crosswise or transversely across the fire, immediately over and above it, so as to receive the direct heat of the flames rising from the fuel, whereby they become intensely heated. Each of the pipes E extends down to a point below the level of the fire, where it passes through the front or side wall of the furnace, its outer end, $c$, being open to allow of the inward flow of the atmospheric air, which then passes up into that portion of the pipes above the fire, where it becomes thoroughly superheated by contact therewith, after which it passes through the longitudinal portions $d$ of these pipes, which extend backward to the rear of the furnace, and thence into the transverse portions $e$, which extend across the flame-bed C in close proximity therewith. The ends $f$ of the pipes are closed, and the transverse portions $e$ are provided on their upper sides with a series of perforations or discharge-orifices, $g$, through which the superheated air is emitted in fine streams or jets, which impinge upon and become thoroughly commingled with the smoke and volatile gases as they flow over from the furnace A into the combustion-chamber D, whereby their instantaneous ignition and combustion is produced, causing them to be almost entirely consumed within the combustion-chamber, thus intensifying the heat and effecting a great saving in the consumption of fuel.

The constant passage of the atmospheric air through the pipes E tends to prevent that portion within the furnace A from becoming unduly heated or burned out by the action of the fire beneath, which is an important consideration, as it avoids the frequent removal and replacing of these pipes. Furthermore, the intense heat generated is all retained and utilized, and may be brought to bear at any desired point or points by varying the position of the perforated portions $e$ of the pipes, while all of the smoke, noxious gases, and sparks are consumed, thus obviating the necessity of building chimneys of great height to carry off these products of combustion.

The supply of atmospheric air issuing from the apertures $g$ may be regulated by means of plates or registers $h$, adapted to fit over the inlet ends $c$ of the pipes E, as seen in Fig. 1.

The portions $e$ of the pipes E may, if desired, be provided with a series of discharge-nipples instead of the perforations $g$.

The pipes E or superheater may be of circular, oval, or other suitable form in cross-section, and the corners or elbows may be angular or curved, as desired.

Our improvements can be easily and cheaply applied to furnaces for stationary boilers, steamboats, and locomotives, and also to ranges, stoves, fire-places, &c., or wherever a fire is required, without any alteration or tearing away of the original parts or setting of the furnace, stove, or fire-place, thus rendering our invention especially applicable to furnaces, &c., already in use.

In addition to the above advantages, a furnace having our improvements applied thereto is capable of burning, with the best results, tan, sawdust, green wood, wet peat or hops, and screenings of all kinds, without the employment of a blower.

We are aware that there are a variety of constructions of furnaces wherein heated air is conducted by pipes through the furnace to the combustion-chamber; hence we make no broad claim to such invention, but confine ourselves to our precise construction and arrangement.

What we claim as our invention, and desire to secure by Letters Patent, is—

The combination, with the furnace A and combustion-chamber D, of a series of air-superheating pipes, E, communicating with the atmospheric air and extending crosswise within the furnace directly over the fire and then backward in the rear thereof, and provided with transverse portions $e$, extending across the flame-bed C and having outlets or discharge-orifices $g$, through which the superheated air is emitted in jets or fine streams, so as to impinge upon and commingle with the smoke and gaseous products of combustion within the chamber D, all constructed and arranged to operate substantially in the manner and for the purpose set forth.

Witness our hands this 15th day of September, A. D. 1880.

PETER KILROY.
JULIUS A. FLICK.

In presence of—
P. E. TESCHEMACHER,
CHAS. E. GRIFFIN.